July 21, 1931.  J. A. TOLEIK  1,815,280
ELECTRIC SOLDERING MEANS
Original Filed Jan. 30, 1926   3 Sheets-Sheet 3

Inventor:
John A. Toleik
By Munday, Clarke & Carpenter
Attys.

Patented July 21, 1931

1,815,280

UNITED STATES PATENT OFFICE

JOHN A. TOLEIK, OF WEST ORANGE, NEW JERSEY, ASSIGNOR TO AMERICAN CAN COMPANY, OF NEW YORK, N. Y., A CORPORATION OF NEW JERSEY

ELECTRIC SOLDERING MEANS

Original application filed January 30, 1926, Serial No. 84,815. Divided and this application filed August 1, 1927. Serial No. 209,652.

My invention relates to soldering machines employed particularly in the soldering of the side seam to an ordinary tin can such as is universally used for packaging food products, and is a division of my application Serial No. 84,815, filed January 30, 1926.

Metallic containers comprising the ordinary tin can have long been hermetically sealed by the application of solder, applied to the side seam composing the junction between the edges of the blank which have been formed to their cylindrical or other shape; the side seam soldering machines have usually been connected with the body forming machines and adapted to operate in synchronism with the said body machines. In this type of soldering machine, the hollow metallic container is conveyed in a horizontal path over an elongated roller operating within a bath of molten solder. Previous to my invention the proper temperature for keeping the solder in molten condition or in any proper form for application to the side seam has been accomplished through the use of gas burners positioned beneath the solder bath. Such a machine is illustrated, for example, in the pending John Murch application, Serial No. 43,067, filed July 13, 1925, in the United States Patent Office.

One of the objects of my invention resides in providing a soldering apparatus of the character described wherein the heating for the bath is effected by placing the heating means directly into the solder contained within the bath; and more particularly, by providing electrical heating means placed directly into the solder contained within the bath, thereby obviating the necessity of using gas burners with their large percentage of heating losses.

Another object of my invention resides in the provision of heating elements that are of such a compact nature as to be insertible within a solder bath that is even smaller than the ordinary solder bath used at the present time. In fact, with the use of gas as a heating element, wherein the heat is applied to the outside of the metallic walls of the solder bath, it is necessary to provide a solder retaining chamber of relatively great depth in order to allow for a certain retention of heat units within the mass of solder contained within the bath. By the use of my invention the heat is applied directly to the solder, and it is therefore not only possible, but entirely advantageous to limit the capacity of the solder chamber so that the heating unit is very closely associated to the solder applying roll that removes the solder from the bath and applies it to the side seam of the metallic container being soldered.

A further object of my invention is the provision of a bath that can be practically insulated against radiation of heat. Inasmuch as the heating element is on the inside of the bath it is possible in my invention to insulate practically all of the radiating surface of the walls of the solder bath. A further object of my invention resides in the economical saving of heat units made possible by the prevention of heat radiation and the compactness of the entire soldering mechanism.

Still another object of my invention resides in the provision of a novel type of soldering roll, including a portion thereof having a raised ridge, preferably in the form of a peripheral ridge whereby the solder is more effectively applied.

Numerous other objects and advantages of the invention will be apparent as it is better understood from the following description, which, taken in connection with the accompanying drawings, discloses a preferred embodiment thereof.

A detailed explanation of the various elements comprising my improved soldering machine follows, and reference should be had to the accompanying drawings wherein like numerals designate corresponding parts throughout the same.

Figure 1:
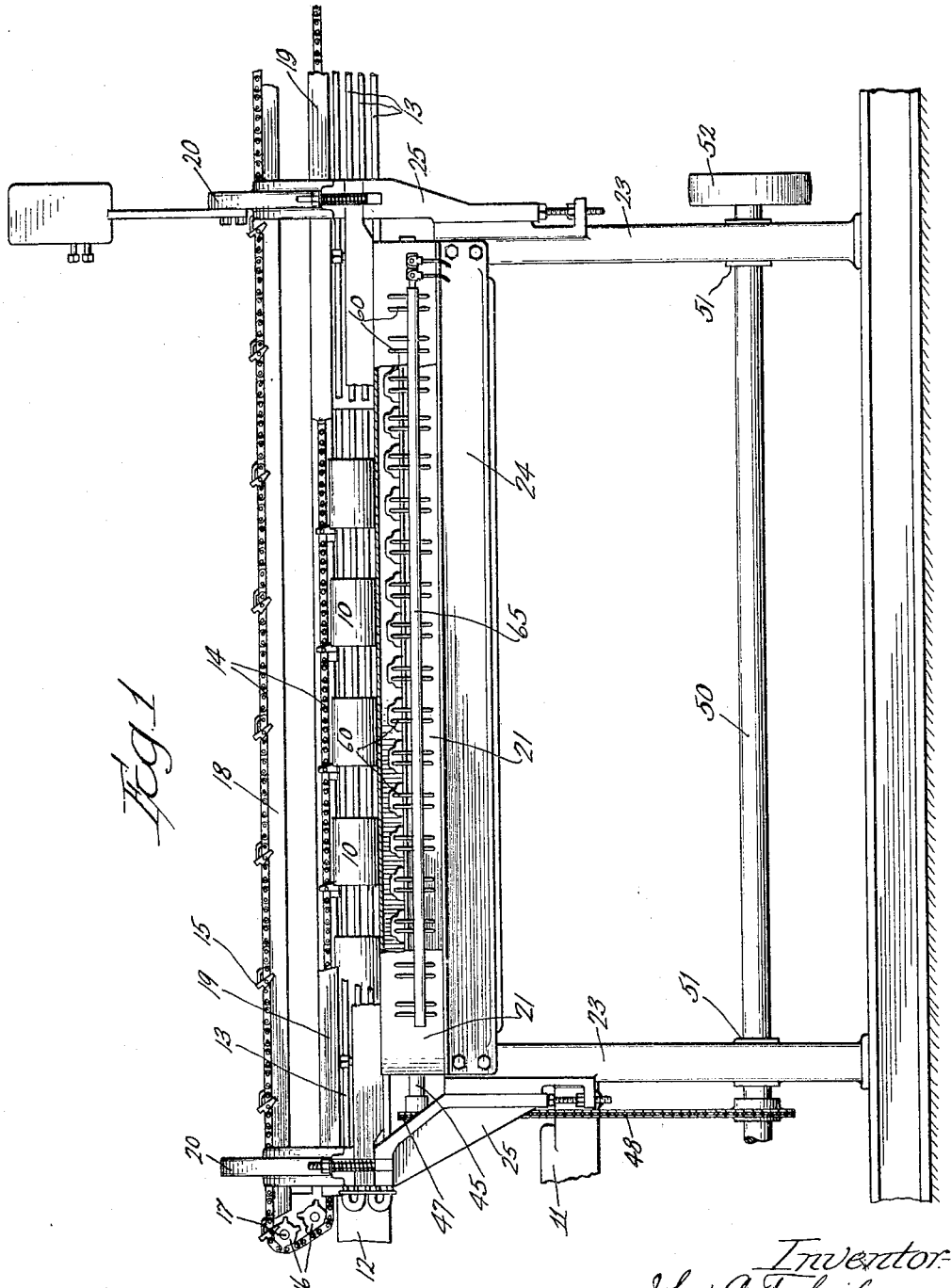
Fig. 1 is a longitudinal elevation of my improved soldering machines, parts being broken away to more clearly illustrate the invention.

The formed hollow metallic container 10 to which solder is to be applied, is received from the end of the body forming machine, a part of which is shown at 11 and 12 in Fig. 1. The numeral 12 designates the mandrel or horn of the body forming machine about which the formed container is positioned and from which the container is moved into the soldering machine—see Fig. 1. The body forming mandrel 12 communicates with a series of retaining guides or pipes 13 which are disposed about a central axis and spaced to constitute an outside holding member for the metallic container 10. This form of holding guide is well known in the art and for fuller details reference may be had to the afore-mentioned Murch application, Serial No. 43,067. The formed container 10 is conveyed in a horizontal plane along the length of the guides 13 by means of a continuous conveyer chain 14 provided with catches 15, one of which engages the upper rear edge of each container 10 and moves it toward the right as viewed in Fig. 1. The said conveyor chain 14 passes over idler sprockets 16 disposed on shafts 17 shown to the left and in the upper portion of Fig. 1, the opposite end of the conveyer chain 14 passing over a suitable sprocket, not shown. The upper travel of the conveyer chain 14 takes place over the supporting bar 18 and the lower travel of the chain is contained within suitable guides 19 held in position by brackets 20.

Figure 3:
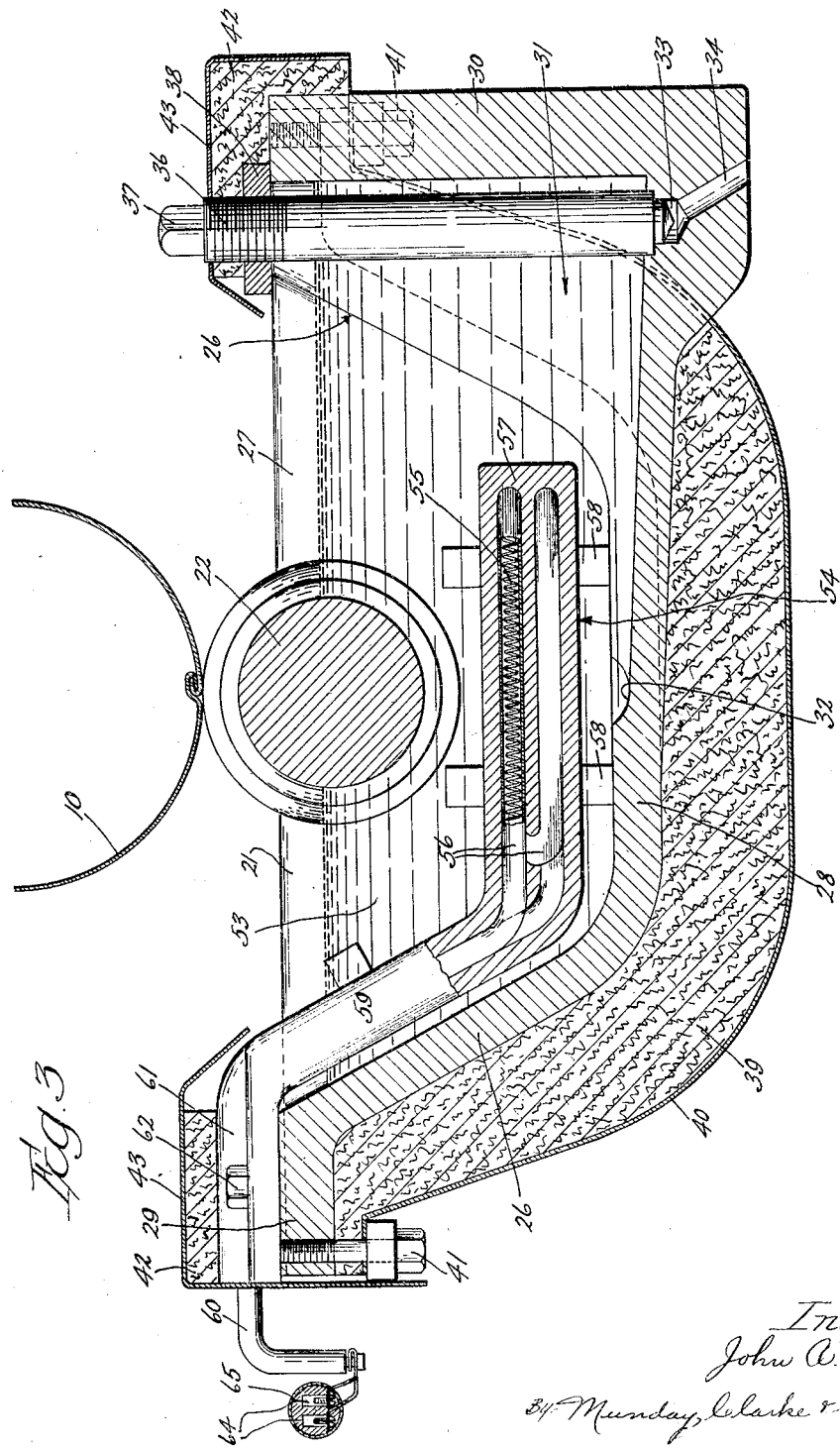
Fig. 3 is a transverse sectional view taken substantially along the broken line 3—3 in Fig. 2 of the drawings, this view being greatly enlarged to more clearly illustrate the various parts of the machine.

During the travel of the container 10 along the longitudinal length of the guides 13, the same passes over a solder trough or bath 21 in which rotates a longitudinal solder applying roller 22, having a peripheral ridge or ridges 22′, the upper surface of which contacts the lower edge of the metallic container 10—see Fig. 3. The said solder trough is supported upon suitable legs 23 held together by a cross-bar 24, the said legs 23 carrying on their upper ends, brackets 25 which in turn support the brackets 20 previously referred to.

As clearly shown in Fig. 3, the solder trough or bath 21 consists of side walls 26, end walls 27, a bottom 28 and extended top flange 29. Positioned in one of the walls 26 is an extension 30 forming a pocket 31 communicating with the interior of the trough 21. The pocket 31 communicates with a depressed drain 32, formed centrally in the bottom 28. As shown clearly in Fig. 2 each one of the solder applying elements or rolls 22 is preferably shaped so as to provide a peripheral ridge 22′ with the adjacent portion of the roll tapering to a similar diametral dimension longitudinally of the roll, so that the solder will accumulate at the parallel ridge and will be applied to the can end more effectively by this ridged portion. The pocket 31 and the drain 32 constitute a passage which communicates with a bore 33 and an opening 34 in the bottom 28, this being for the purpose of withdrawing the molten solder from the bath when it is desired to replace the same or clean out the inside of the bath. A valve 35 normally closing the bore 33 prevents passage of the molten solder from the interior of the bath, out through to passageway 34, the said valve being in the form of a bolt threaded at 36 and provided with a squared head 37. The thread portion 36 operates within a plate 38 attached to one of the flanges 29. By this construction, when it is desired to permit the solder to run out from the interior of the bath, the bolt 35 is raised by turning the same by means of any suitable connection with the head 37, as for example, by means of a wrench, and this turning of the bolt 35 by means of the threads 36 and 38, lifts the bottom part of the bolt 33 and permits the solder to flow from the bath.

The entire lower portion of the bath 21 is inclosed by diatomaceous earth 39 or any other suitable material which is retained in proper position inclosing the walls 26 and 27 and the bottom 28, by means of a sheet metal plate 40 held by suitable bolts 41 threadedly connected into the flanges 29. The sides and upper part of the said flanges 29 are also protected by suitable insulation 42 retained in position by sheet metal plates 43—see Fig. 3.

Figure 2:
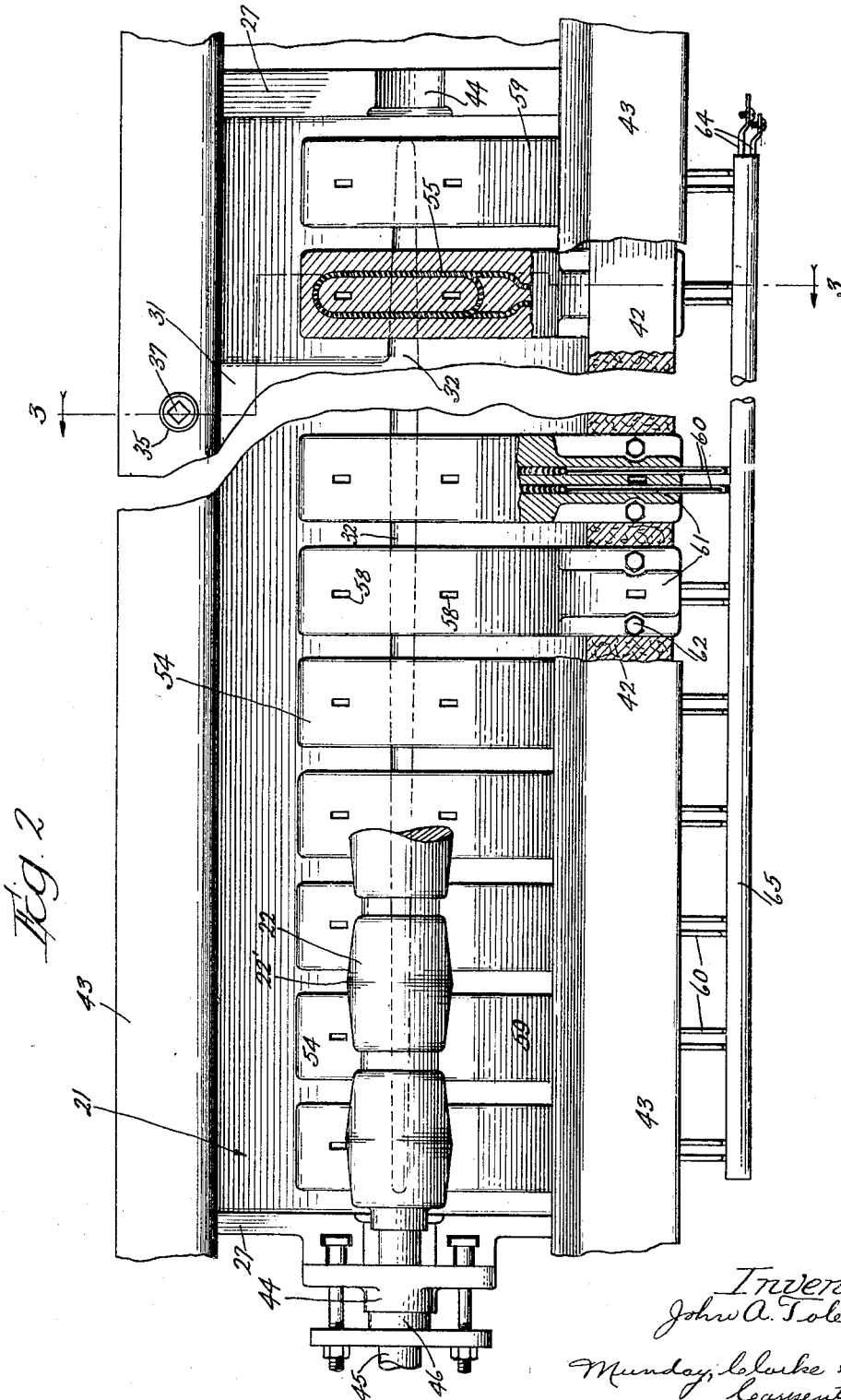
Fig. 2 is a fragmental plan of my soldering machine on a larger scale, parts of the drawings being broken back to display sections taken on various elevations, and various parts of the machine being broken away for clearer illustration.

As clearly illustrated in Fig. 2, the solder applying roll 22 is journaled in suitable bearings 44 formed in the end walls 27, one end of the roller 22 being extended at 45, this end passing through a suitable stuffing box 46 in the wall 27. The outer extremity of the said extension 45 carries a sprocket 47—see Fig. 1. A chain 48 passes over the said sprocket 49 fixed to a drive shaft 50 journaled at 51 in the legs 23. The said drive shaft 50 carries a pulley 52 through which power can be applied in any suitable manner, or the drive shaft may be an extension of the driving mechanism connected with the body forming machine. Rotation of the drive shaft 50 through the medium of the sprockets 49 and 47 and the chain 48, therefore causes rotation of the solder applying roll 22 which in turn carries the solder upwardly from the mass of solder 53 contained within the bath, and projects it into the seam of the container 10 as illustrated in Fig. 3. Heating and melting the solder 53 is accomplished by means of a plurality of heating and melting units 54 arranged within the trough 21, resting upon the bottom 28 thereof. The said heating and melting units consist of resistant coils 55 incased in protecting tubes 56 contained within a metallic casing 57 supported upon feet 58 resting upon the bottom 28 of the trough. The said resistant coils pass upwardly into an inclined section or neck 59 of each heating unit 54 and communicates with feed wires 60 passing through a horizontal extension 61 of each heating unit 54, the said unit being held in fixed position by means of the bolts 62 secured into one flange 29 of the bath 21, as clearly illustrated in Figs. 2 and 3. The said wires 60 pass outwardly from the extension 61 and are connected by means of contact clamps 63 to their respective buss bars 64 contained suitably insulated within the shell 65. Electrical current is supplied to the buss bars 64 and passes through the resistant elements 55 by connection with any suitable source of electrical energy. The current is to be such as to keep the solder 53 melted and capable of being taken up by the roller 22.

It will be seen from a perusal of the foregoing specification that the further and highly important advantages of my invention reside in the dispensing with the dangerous and unsanitary gas fumes always attendant upon the soldering devices in present day use. A great amount of fumes and the undesirable heat which has always been associated with machines of the ordinary type, has at times become very serious in a factory during warm weather, and has greatly jeopardized the health of those operating the soldering machine, also in the use of gas heated soldering machines it is almost impossible for an operator to stand sufficiently close to the soldering roll to permit satisfactory inspection. In my apparatus practically no heat is given off laterally and therefore close inspection is possible without any attendant undesirable conditions for the operator.

Yet another advantage of my invention over the ordinary soldering machine is found in the elimination of any operations depending upon technical skill. In operating my improved solder bath it is only necessary to throw an electric switch in order to project the heat directly into the solder. In the ordinary type of soldering machine, the proper relation between the supply of air and gas requires constant attention, and is the work of an expert in that line.

Actual operation has shown that the cost of electrical energy used in the heating of my improved solder bath is less than the cost required to maintain operation of the ordinary gas heated soldering mechanism. This cost varies with the cost of electrical power, according to the place wherein the machine is operated, but inasmuch as my invention makes use of practically all of the heat passing through the heating elements it is found that the total cost of operation of the machine does not equal the cost of operation of the gas heating elements with their attendant heat losses of radiation and conduction.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the character described, the combination of a relatively shallow open topped container having sloping side walls and lateral top flanges, an insulation for the bottom of said container, a metallic plate covering said insulation, an insulation for said top flanges, a metallic plate covering said insulation for said top flanges, means for holding said insulation and covering plates in position, a plurality of solder melting units comprising metallic casings having neck portions extending over one of the top flanges of said container and beneath the heat insulation thereof, and electrical resistance elements embedded in said metallic casings and passing through said neck and an electrical buss connection to the melting elements of each of said resistance units.

2. In a device of the character described, the combination of a solder bath container adapted to contain a bath of solder, a series of electrical solder-melting units for the solder each comprising a metallic casing having spaced therein a plurality of resistance elements imbedded in said metallic casing and a neck extending from said casings up to the top of the wall of said bath and mounted thereon, buss bars extending along said bath, and means for conducting electric current through said necks and to said resistance elements.

3. The combination of an elongated solder bath, a rotary solder applying roll arranged in said bath and extending below and above the surface of the melted solder when in operation, said roll having at different parts of its length means for taking up and applying melted solder, a plurality of electrical resistance elements arranged in said melted solder in a series along and under said roll, and means for conducting electric current to said resistance elements.

4. The combination of an elongated solder bath, a rotary solder applying roll arranged in said bath and extending below and above the surface of the melted solder when in operation, said roll having at different parts of its length means for taking up and applying melted solder, a plurality of electrical solder-melting units having resistance elements and arranged in said melted solder in a series along and under said roll and having necks extending up between the solder roll and the wall of said bath and supported on said wall, and means for conducting electric current through said necks and to said resistance elements.

5. An apparatus for melting and applying solder to the side seams of cans, having in combination movable solder-applying means adapted to have the cans passed therealong with their side seams in contact therewith, an elongated solder bath container supporting said applying means, means for guiding and propelling cans along said applying means, electrical solder-melting means in said container near said roll, means for holding said melting means in said position spaced from said applying means, and means for supplying electric current to said solder-melting means, and means for moving said solder-applying means relative to said melting means and relative to the solder melted thereby.

JOHN A. TOLEIK.